United States Patent [19]

Rudolph

[11] Patent Number: 5,826,794
[45] Date of Patent: Oct. 27, 1998

[54] AIRCRAFT SCOOP EJECTOR NOZZLE

[75] Inventor: Peter K. C. Rudolph, Seattle, Wash.

[73] Assignee: The Boeing Company, Seattle, Wash.

[21] Appl. No.: 807,547

[22] Filed: Feb. 28, 1997

[51] Int. Cl.[6] .................................................. B63H 25/46
[52] U.S. Cl. .............................. 239/265.17; 239/265.13; 239/265.37; 60/242; 60/262; 60/271
[58] Field of Search ......................... 239/265.13, 265.17, 239/265.37, 265.33; 60/226.1, 242, 262, 271

[56] References Cited

U.S. PATENT DOCUMENTS

| | | | |
|---|---|---|---|
| 2,952,124 | 9/1960 | Pearson | 239/265.13 |
| 2,997,845 | 8/1961 | Oulianoff . | |
| 3,263,931 | 8/1966 | Bartek et al. . | |
| 3,409,228 | 11/1968 | Mehr . | |
| 3,432,100 | 3/1969 | Hardy et al. | 239/265.37 |
| 3,463,402 | 8/1969 | Langston, Jr. | 239/265.17 |
| 3,524,588 | 8/1970 | Duval . | |
| 3,550,721 | 12/1970 | Bruner . | |
| 3,613,826 | 10/1971 | Cabassut . | |
| 3,637,041 | 1/1972 | Hilbig . | |
| 3,647,020 | 3/1972 | MacDonald . | |
| 3,664,455 | 5/1972 | Duvvuri . | |
| 3,695,387 | 10/1972 | Hilbig . | |
| 3,774,868 | 11/1973 | Goetz . | |
| 3,897,169 | 7/1975 | Fowler . | |
| 4,064,692 | 12/1977 | Johnson et al. | 60/271 |
| 4,095,417 | 6/1978 | Banthin . | |
| 4,165,609 | 8/1979 | Rudolph . | |
| 4,175,640 | 11/1979 | Birch et al. . | |
| 4,215,536 | 8/1980 | Rudolph . | |
| 4,422,524 | 12/1983 | Osborn . | |
| 4,537,026 | 8/1985 | Nightingale . | |
| 4,690,329 | 9/1987 | Madden . | |
| 4,819,876 | 4/1989 | Thayer . | |
| 4,958,489 | 9/1990 | Simmons . | |
| 5,044,559 | 9/1991 | Russell et al. . | |
| 5,154,052 | 10/1992 | Giffin et al. . | |
| 5,291,672 | 3/1994 | Brown . | |
| 5,343,697 | 9/1994 | Johnson et al. . | |
| 5,351,480 | 10/1994 | Kretschmer | 239/265.17 |

OTHER PUBLICATIONS

"The Jet Engine," chapters 6, 14, 15 and 19, Rolls–Royce plc, 1992.

*Primary Examiner*—Charles G. Freay
*Attorney, Agent, or Firm*—Christensen O'Connor Johnson & Kindness PLLC

[57] ABSTRACT

An engine exhaust nozzle (36) is provided for reducing exhaust noise in an intermediate bypass ratio turbofan engine. The nozzle (36) includes a plurality of scoop ejectors (38) placed equal distances about the circumference of a nozzle outer structure (46). A translatable centerbody (52) is located within the outer structure (46). The annular space between the outer structure (46) and the centerbody (52) define a convergent-divergent exhaust duct (56). Each scoop ejector (38) has a forward inlet (71) and an aft outlet (72). The scoop ejectors are rotatably connected to the outer structure (46) at a pivot point located approximately midway along the ejectors. The axes of rotation (82) of the scoop ejectors lie transverse to the nozzle longitudinal centerline. In an open position, the scoop ejectors are rotated so that the inlets (71) extend into the ambient airstream and the outlets (72) extend into the exhaust duct (56). Aft nozzle flaps (114) are used to form the rearmost portions of the nozzle (36). During noise suppression, the scoop ejectors (38) are rotated open to allow ambient air (40) to enter the exhaust duct (56) at aspiration ratios of generally less than 40% of the engine exhaust (42). When noise suppression is not needed, the scoop ejectors (38) are closed by rotating them so that the inlet (71) is flush with the exterior surface (48) and the outlet (72) is in a sealed and flush contact with the inner duct wall (50).

23 Claims, 5 Drawing Sheets

AIRCRAFT SCOOP EJECTOR NOZZLE

FIELD OF THE INVENTION

The present invention relates to aircraft jet engine nozzles, and more particularly, to ejector nozzles for use in reducing engine exhaust noise in intermediate bypass ratio turbofan engines.

BACKGROUND OF THE INVENTION

Jet exhaust noise results from the turbulent mixing of exhaust gases with the atmosphere. The noise is influenced by the shearing action caused by the relative speed and temperature between these airflows. This noise can be reduced by mixing these two airstreams internally and/or by reducing their relative temperature and velocity. Supersonic airplanes require a propulsion system that produces high specific thrust (high exhaust velocities) for acceleration and cruise at supersonic speeds. Therefore, the engines for supersonic airplanes are straight jets or very low bypass ratio engines. To produce sufficient thrust for take-off, these engines have to be operated at or near their maximum power capability, producing high exhaust velocities. Therefore, the exhaust noise is especially high and hard to reduce on supersonic airplanes.

Ejector nozzles are currently used in pure jet and low bypass ratio engines as noise suppression devices. Generally, ambient air is introduced (i.e., aspirated) into a nozzle duct through auxiliary inlets. The ambient air mixes with the high velocity and hot engine exhaust, thereby reducing the overall velocity and temperature of the engine exhaust before it exits the nozzle. Mixing devices are generally used in conjunction with the ejectors in the pure jet and low bypass ratio applications in order to more thoroughly mix ambient air with exhaust gas.

Turbojet and low bypass ratio engines require high aspiration levels (i.e., generally greater than about 60% of the engine exhaust) in order to provide adequate levels of noise suppression. High aspiration levels require the ability to significantly vary nozzle geometry. This requires ejectors capable of assuming a wide range of positions. In addition, the ejectors and mixing components must be capable of being selectively removed from the nozzle duct airflow path in order to transition the nozzle to an acceptable performance configuration for high speed flight, when noise suppression is not required. The combination of these requirements often results in nozzle designs that are heavy, complex, and have poor performance characteristics.

In contrast to the pure jet and low bypass ratio engines, intermediate bypass ratio engines (i.e., generally in the range of 0.6 to 1.2) usually create less jet exhaust noise to begin with due to their ability to produce thrust with lower average exhaust velocities. Noise reduction for intermediate bypass ratio engines generally consists of using a common or integrated exhaust nozzle that partially mixes the bypass and primary exhaust gases prior to their ejection into the atmosphere.

It is known to use ejector nozzles to improve nozzle performance in specific flight conditions. In particular, adding ambient air around the periphery of the exhaust gases of a straight jet or low bypass engine reduces aerodynamic boattail drag at transonic conditions. This is done during transonic and supersonic flight conditions where noise suppression is of no concern. For low bypass ratio applications, ejector nozzles are used to reduce jet noise. But this has generally only been done as a retrofit to older subsonic airplanes to bring them in compliance with new and stricter noise rules. It has been proven repeatedly that an ejector does not provide performance benefits at low speed operation such as take-off and landing. Ejectors may provide a small thrust augmentation statically, if well designed. But at typical take-off speeds the thrust augmentation has been eliminated by external drag and internal losses. At subsonic cruise speeds a deployed or fixed geometry ejector causes significant thrust losses and is absolutely useless, since noise reduction is not needed in cruise.

Up to very recently, it was a common belief that the optimum engine cycle for supersonic airplanes are straight jets or very low bypass ratio engines. In order to meet stage 3 or more stringent future noise rules these engines needed jet noise suppressers with a capability of up to 22 decibel. This called for ejector nozzles with aspiration ratios of 80 to 120%. The huge geometric variation required cannot be met by an axisymmetric exhaust system, but required two-dimensional ejector nozzles of large dimensions, high complexity and high weight. Also, the high exhaust gas temperatures of these engines make the material selection for those exhaust systems very difficult.

Newer engine optimization studies indicate that when engines are treated to the same low jet noise level, the engine cycle for supersonic airplanes optimizes at significantly higher bypass ratios (0.8 or even higher). Since the engines for supersonic airplanes are generally sized by end-of climb thrust requirements, they produce excess thrust at low speeds. They can therefore be operated at less than full power for take-off. Increased bypass ratio and the associated part power take-off both contribute to lowering jet velocities and the requirements for jet noise reduction with the help of an ejector nozzle. The increased bypass ratio also lowers the mixed flow gas temperature and makes the materials choice for the exhaust system simpler.

These discoveries suggest that an optimum noise suppression solution for some supersonic aircraft is to aspirate a relatively small amount of ambient air into the engine exhaust of intermediate bypass ratio turbofan engines during takeoff climb-out and landing conditions. This has resulted in a need for such an ejector nozzle. The ideal nozzle should be light, compact, simple, and reliable. The ideal nozzle should include mixing components to further increase the mixing of ambient air with exhaust gas in a way that does not adversely affect the engine and nozzle performance. Also, the ejector nozzle should be operable and efficient at speeds up to Mach 0.7 or 0.8 to permit jet noise suppression during climb-out. Further, the ideal nozzle should not adversely affect the nozzle performance during non-suppression flight at high speeds.

The efficient operation of an ejector depends on several parameters. First, the internal high energy (pressure) engine exhaust flow has to be accelerated to a very high velocity, so that its pressure drops and helps suck in low energy (pressure) ambient air. Secondly, to maximize the amount of ambient air sucked in through a given inlet passage, it is also important to increase the length of shear layer between the streams, which calls for a lobed confluence of the flows or alternating channels. Thirdly, in order to get as complete mixing as possible inside the limited length nozzle, to treat and contain the associated mixing noise, the cross-sectional size of the interspersed flows has to be small. The present invention is directed to provide an ejection nozzle that meets the afore listed objectives.

SUMMARY OF THE INVENTION

In accordance with this invention, an axisymmetric exhaust nozzle is provided for reducing noise in an intermediate bypass ratio turbofan engine. The nozzle includes a plurality of scoop ejectors placed equal distances about the circumference of a nozzle outer structure. A preferred number of scoop ejectors is between 12 to 36. A translatable centerbody is located within the outer structure. The annular spaces between the outer structure and the centerbody define a convergent-divergent exhaust duct. The plug actuation system allows a change in the throat area by moving the plug fore or aft, to account for changes in engine power. An actuation mechanism in the outer duct wall deploys or retracts the ejector scoops. The ejectors have two basic positions, open and closed. Aft nozzle flaps are provided to form the rearmost position of the nozzle.

In accordance with further aspects of this invention, each scoop ejector includes a forward inlet, an aft outlet, and a passage extending therebetween. Each ejector scoop is rotatably connected to the outer structure via a hinge located approximately midway along the longitudinal length of the ejector. The axis of rotation is transverse to the nozzle longitudinal centerline. Each scoop ejector is shaped to guide ambient air in a slightly S-shaped path in going from the inlet to the outlet. The ejectors are preferably fabricated from heat resistance materials, such as stainless steel or Inconel.

In accordance with other aspects of this invention, an actuation mechanism rotates the ejectors between their open and closed positions. In one embodiment, the actuation mechanism includes rotary actuators located in the outer structure at positions located forward of the scoop ejectors. During noise suppression, the ejector is rotate open so that the inlet extends into the ambient airstream and the outlet extends into the exhaust duct. The scoop ejector allows ambient air to enter the exhaust duct at aspiration ratios of generally less than about 40% of the engine exhaust. When noise suppression is not needed, each scoop ejector is closed by rotating the ejector so that the inlet is more or less flush with the outer surface of the nozzle, while the aft end stows in a pocket inside the nozzle. In moving between the closed to open position, each scoop ejector is rotated an angle between about 15 and about 35 degrees relative to the nozzle longitudinal centerline.

In accordance with yet further aspects of this invention, the scoop ejectors are spaced equal distances apart about the outer structure. The exhaust duct has a greater radial dimension in the regions between the scoop ejectors than at the scoop ejectors.

In accordance with yet other aspects of this invention, the aspirated air is formed of ambient air and the engine exhaust is formed of a combination of primary exhaust and bypass airflow. In such instances, the ambient air is preferably aspirated in an amount lying in the range of about 20% to about 40% of the engine exhaust.

In accordance with still further aspects of this invention, the scoop ejector includes a curved aft inner surface for reducing engine exhaust airflow turbulence and a rounded inlet lip along the ejector outer forward inlet edge. Preferably, the ejector passage converges in going from the inlet to the outlet.

In accordance with still other aspects of this invention, the exterior shape of the nozzle outer structure is substantially cylindrical and the interior sidewalls are bulged outwardly near the location of the scoop ejectors. The centerbody includes a longitudinally translatable plug having a crown. The plug can be translated to locations both ahead of and behind the nozzle interior sidewall bulge in a manner unimpeded by the scoop ejectors. The nozzle interior sidewalls and plug form a throat and the scoop ejectors are located near the throat when the scoop ejectors are in their open positions. The duct cross-sectional area at the nozzle interior sidewall bulge is large when the plug is translated to an aft position. This is useful in reducing the velocity of the engine gases and to minimize losses in the non-aspirated cruise modes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is directed to providing an apparatus for suppressing exhaust noise in intermediate bypass ratio turbofan engines (i.e., bypass ratios of roughly 0.6 to 1.2). As used herein, the term "aspirated air" refers to ambient air. The term "engine exhaust" generally refers to a combination of primary and bypass air that enters the ejector nozzle partially or fully mixed. The term "nozzle exhaust" refers to the combination of the aspirated/ambient air and engine exhaust. A nozzle formed in accordance with the present invention is described below as applied to an axisymmetric nozzle.

Figure 1:
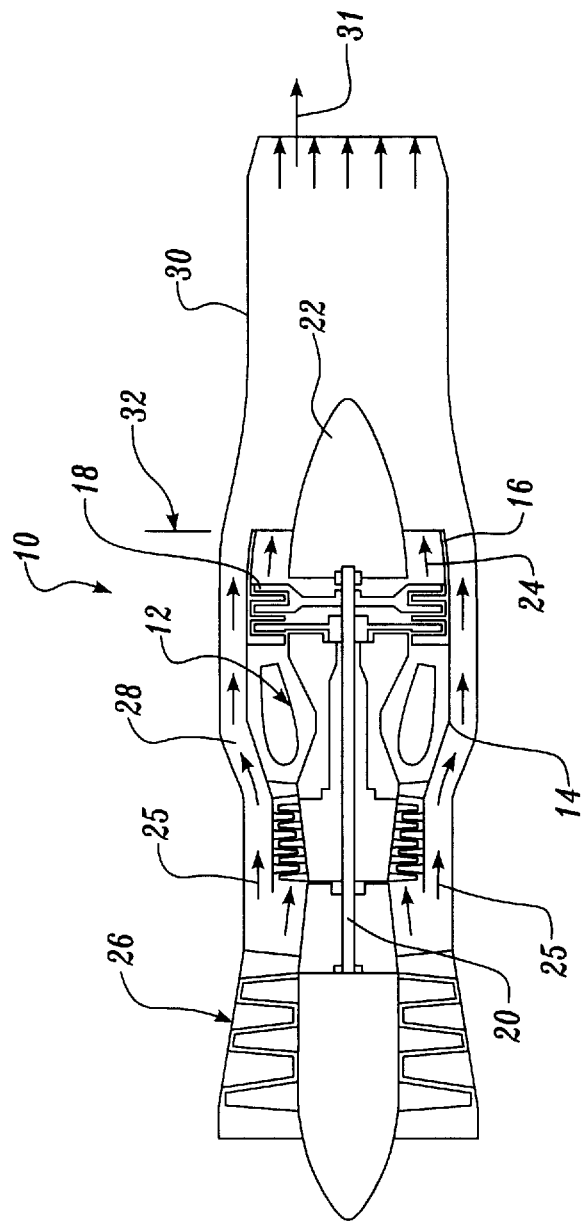
FIG. 1 is a side view of a prior art moderate bypass ratio turbofan engine for supersonic airplanes.

FIG. 1 is provided for general orientation to turbofan engines. Referring to FIG. 1, intermediate bypass ratio turbofan engine 10 includes a gas generator 12 enclosed in a casing 14 to which an end annulus 16 is attached. A series of turbines 18 are located near the aft end of the generator and are mounted to turbine shafts 20. In some turbofan engine designs, a tail cone 22 extends aftward through the interior of the annulus 16, defining a short primary duct between the annulus 16 and the cone 22. The turbines 18 expel primary exhaust 24 rearward, out the primary duct. A fan 26 supplies a secondary or by-pass airstream 25 that flows through a fan duct 28 circumscribing the gas generator 12. The fan 26 is co-axially mounted to a turbine shaft 20. To reduce exhaust noise for intermediate bypass ratio engines, a common exhaust nozzle 30 extends aftward from the fan to form a duct region in which the secondary and primary airflows merge prior to being expelled jointly into the atmosphere as exhaust air 31. The subsonic mixing of bypass and primary airflows occurs just aft of the annulus, at a confluence plane 32. A forced mixer (one is shown in FIG. 2 labeled 37) may be mounted at the confluence plane 32 to promote more rapid and complete mixing of bypass and primary airflows prior to their exiting the common nozzle 30.

Figure 2:
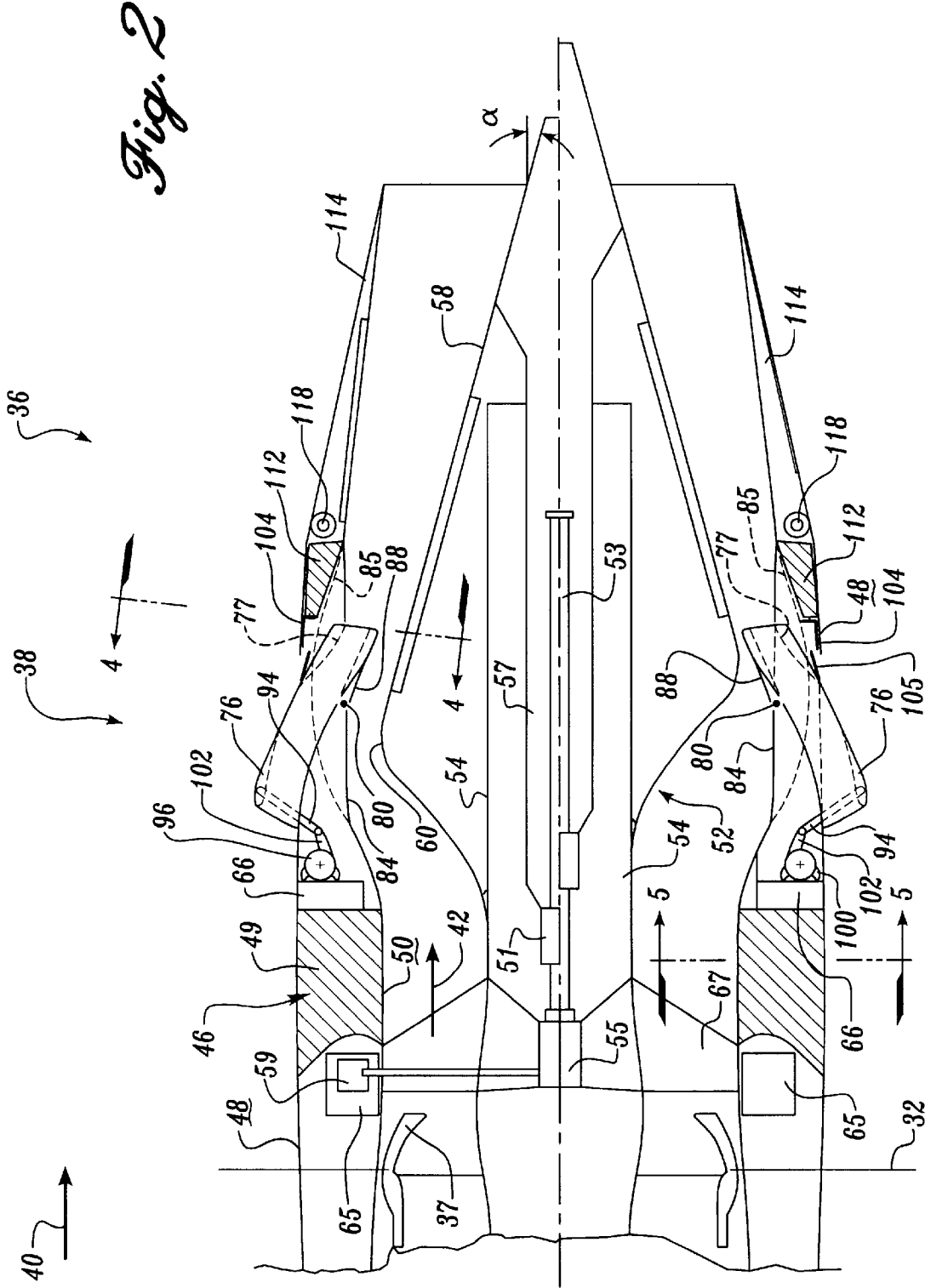
FIG. 2 is a side view of a scoop ejector nozzle formed in accordance with the present invention in an intermediate bypass ratio engine, the nozzle being configured for noise suppression.

FIG. 2 is a side view illustration of one embodiment of an axisymmetric noise suppression scoop ejector nozzle 36 formed in accordance with the present invention for use with intermediate bypass ratio turbofan engines. In general, the nozzle 36 includes a number of scoop ejectors 38 equispaced about the circumference of the nozzle 36. The scoop ejectors 38 are sized to entrain a segmented annulus of ambient air 40 into the nozzle 36 at aspiration ratios of generally less than 40% (depending on flight and engine conditions). The entering ambient air 40 mixes with engine exhaust 42, resulting in a lower combined airflow velocity which in turn reduces jet exhaust noise. During the transonic portion of a flight, the nozzle 36 may utilize the scoop ejectors 38 to maximize flight performance by reducing aft body drag. It is preferred to use a mixer 37 at the confluence plane 32 to promote mixing of bypass and primary airflows.

In more detail, the nozzle 36 includes an outer structure 46 connected to or integral with the bypass airflow duct. If thrust reversers are desired, space may be left available at a forward region 49 in the outer structure within which a thrust reverser system could be accommodated. The outer structure 46 includes numerous support members, e.g., beams, struts, rings, etc., positioned longitudinally and circumferentially at various locations throughout the nozzle. The support members support the weight of the nozzle components and react internal pressure. The present invention uses such support beams and rings to carry the scoop ejectors 38 and associated components as well. Outer skins attached to the outboard regions of the support beams and rings form exterior nozzle surfaces 48. Inner skins attached to the inboard regions of the support beams and rings form nozzle interior surfaces or nozzle sidewalls 50.

These known support members and skins may be modified appropriately for use with the features of the present invention as described herein. In particular, it is preferable to use several circumferential rings throughout the length of the nozzle 36. These rings are held in hoop tension, similar to a large cylindrical pressure vessel. The rings serve to stabilize the nozzle structure at openings in the outer structure. Forward of the thrust reverser, a plug support ring 65 reacts loads from a number of plug support struts 67 that hold a plug support cylinder 54 in place. The plug support ring 65 also reacts thrust reverser loads. A second ring 66 forward of the scoop ejectors reacts thrust reverser aft loads and provides hinge and actuator hard points for the scoops. Aft of the scoops there may be one or more annular tie rings 112. They provide continuity for the aft nozzle outer structure and provide the hard points for hinges and actuators of final nozzle aft flaps 114. Rings 66 and 112 are connected to each other structurally with rectangular beams 69, occupying the outer structure space circumferentially between the scoop openings (see FIGS. 4, 5, and 8).

Figure 3:
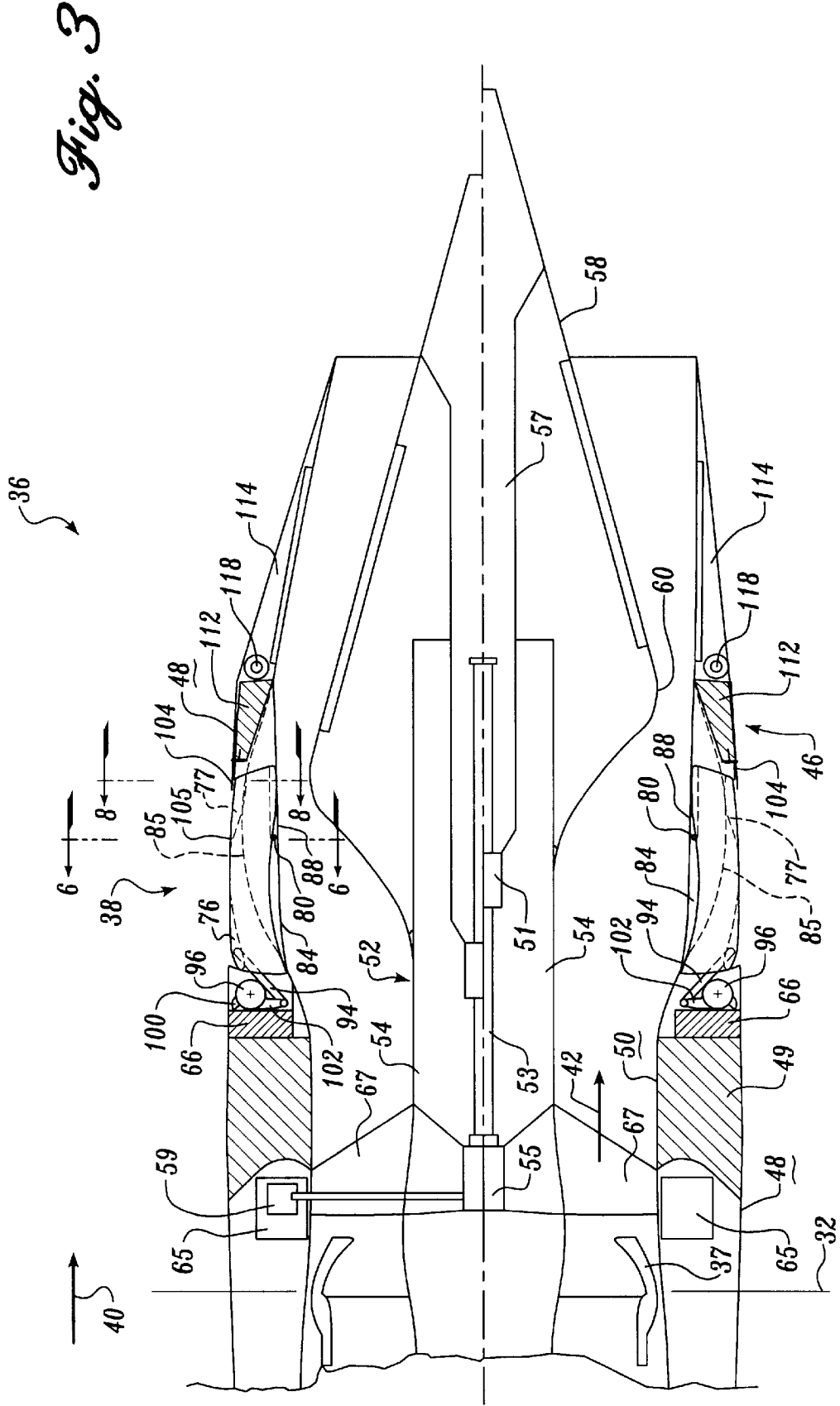
FIG. 3 is a side view of the scoop ejector nozzle of FIG. 2, configured for non-noise suppression.

As shown in FIGS. 2 and 3, the centerbody 52 is located within the nozzle 36 along the nozzle longitudinal centerline. The area between the centerbody outer surface and the nozzle sidewalls 50 defines a nozzle exhaust duct 56. The centerbody 52 is shaped such that by translating the centerbody longitudinally, the desired duct area progression and throat areas and locations for the various engine and nozzle operating conditions can be met. Since translating centerbodies are known in the art of nozzle design, they are described here in only general terms.

The centerbody 52 includes a translatable plug 58 that rides on the structural support cylinder 54. The support cylinder is connected at its forward end to the forward ring 65 with the number of plug support struts 67. A preferred number of struts is four or more. The plug 58 is similar to a cylinder, though, having a forward end that is sized to fit the support cylinder 54 and an aft end that defines a cone, preferably having a half cone angle α of 15 degrees or less. The maximum diameter of the plug is near the middle. This location is termed the plug crown 60. Forward of the crown 60, the duct area between the outer structure sidewalls 50 and plug 58 converges. Aft of the crown 60, the duct area diverges. A duct throat exists in the region where the nozzle exhaust duct 56 changes from divergent to convergent. Fore and aft translation of the plug 58 varies the area and precise location of the duct throat, allowing the nozzle 36 to be matched to a specific engine setting. The upper half of FIG. 2 shows a plug position which opens up the duct area for the engine exhaust and is used for low engine power settings in the noise reduction mode. The lower half of FIG. 2 shows a plug position with a smaller throat area for high engine power. These aspects are discussed more fully below.

Actuation of the plug 58 can be accomplished using any one of a number of methods. One way is to move the plug 58 with a nut or collar 51 threaded onto a screw jack 53 mounted within the support cylinder 54 and connected to the plug 58 via an inner tube 57. The forward end of the screw jack 53 is rotatably connected to a gear box 55 located in the forward end of the support cylinder 54. The gear box 55, which includes bevel gearing and a drive shaft, is rotatably connected to a motor or actuator 59 located in the outer structure 46 through one of the support struts 67. As will be recognized by those skilled in the art, there exists a number of alternative mechanisms for translating the centerbody plug of bypass ratio engines. For example, the forward end of the power screw may be directly driven by a motor located inside the forward end of the support cylinder 54.

Figure 4:
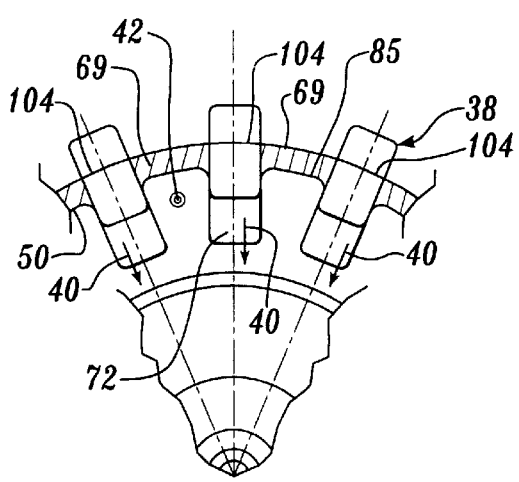
FIG. 4 is a cross-sectional view looking forward along line 4—4 of FIG. 2.
Figure 5:
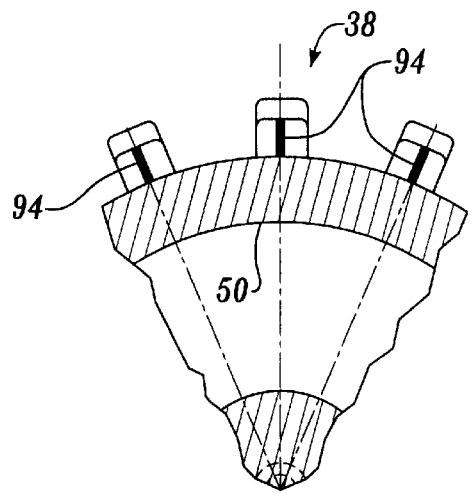
FIG. 5 is a cross-sectional view looking aft along line 5—5 of FIG. 2.
Figure 6:
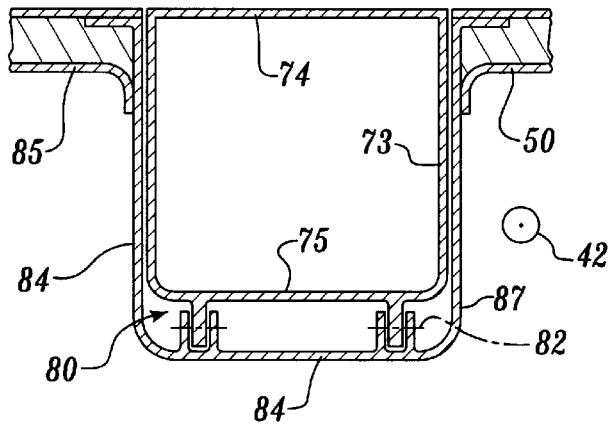
FIG. 6 is a cross-sectional view looking forward along line 6—6 of FIG. 3.

Referring to FIGS. 4–6, the scoop ejectors 38 are spaced equal distances apart about the nozzle circumference, in the outer structure 46. Preferably, the scoop ejectors are interspersed between the multiple longitudinal support beams 69 located in the outer structure 46. The radius of the duct as measured to a location between the scoop ejectors is larger than the radius of the duct as measured at the ejectors 38. The nozzle sidewalls are formed of alternating rigid (ridge-like) structures 84 with outwardly bulged portions 85. This is shown in the cross-sectional views of FIGS. 4, 6, and 8 and is indicated by the dashed outwardly bulged portion lines 85 in FIGS. 2 and 3. Therefore, the cross-sectional profile of the nozzle at the scoop ejectors has a daisy-wheel pattern. As is also shown by the outwardly bulged portion lines 85 in FIGS. 2 and 3, the shape of the sidewall between ejectors is curved longitudinally outward. This duct shape is useful for accommodating the scoop ejectors in their stowed and extended states.

Figure 7:
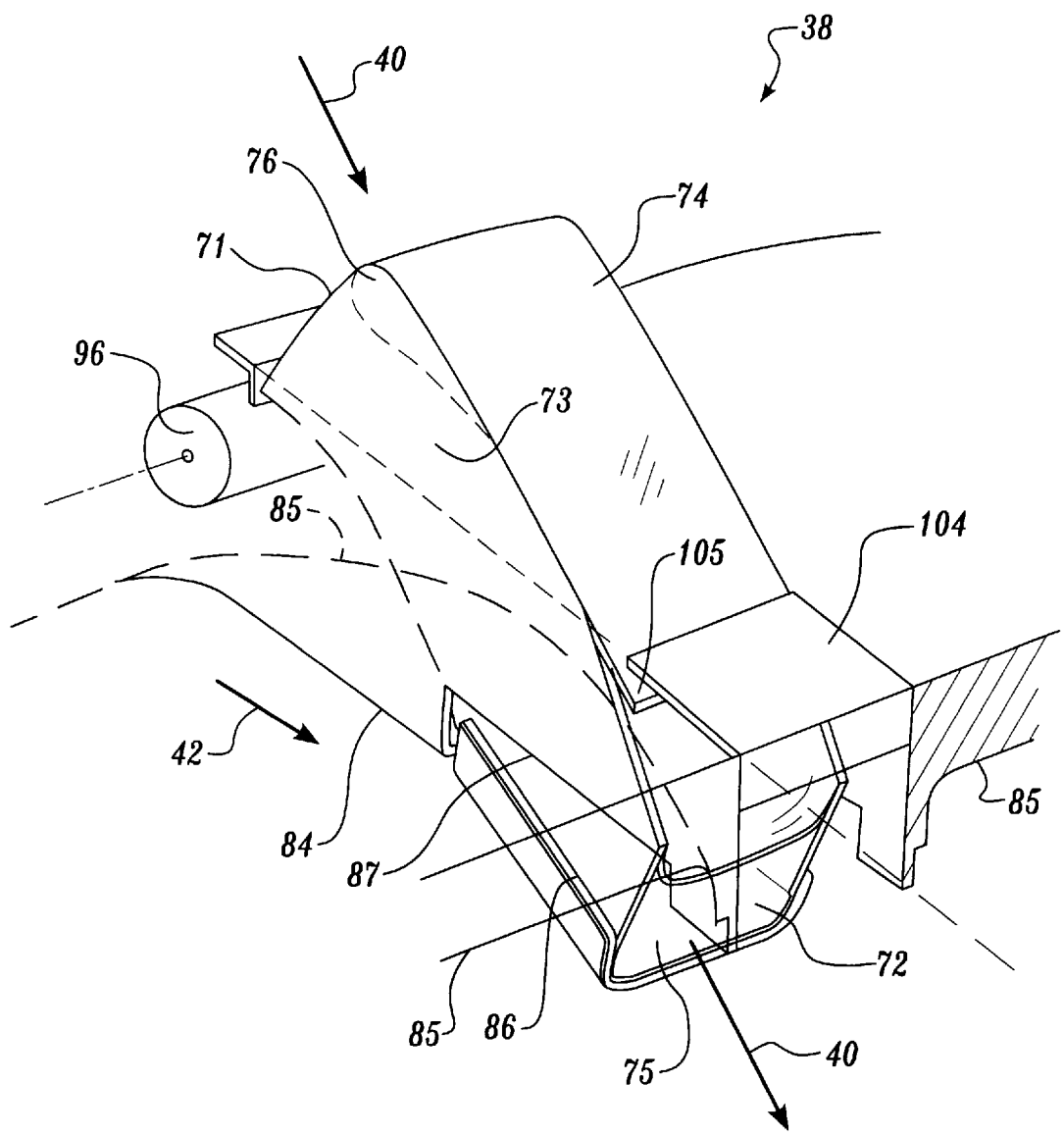
FIG. 7 is a partial perspective view of the scoop ejector shown in FIG. 2.

Referring to FIG. 7, the scoop ejectors 38 are tubular and have a generally rectangular cross-sectional shape. Each scoop ejector 38 includes a forward inlet 71, an aft outlet 72, generally parallel sides 73, and outer and inner walls 74 and 75, respectively. The scoop ejectors 38 are positioned relative to the outer structure 46 such that their forward inlets 71 are longitudinally forward of their outlets 72. The interior surfaces of the ejector walls act as a passageway for incoming ambient air 40. The inlet of the deployed device acts like a scoop for redirecting ambient air 40 into the nozzle. Preferably, there is a slight convergence to this passageway. This aspect is best seen in FIGS. 2 and 3 where portions of the interior surface of the outer wall 74 of the ejectors 38 are depicted by dashed lines 77.

Figure 8:
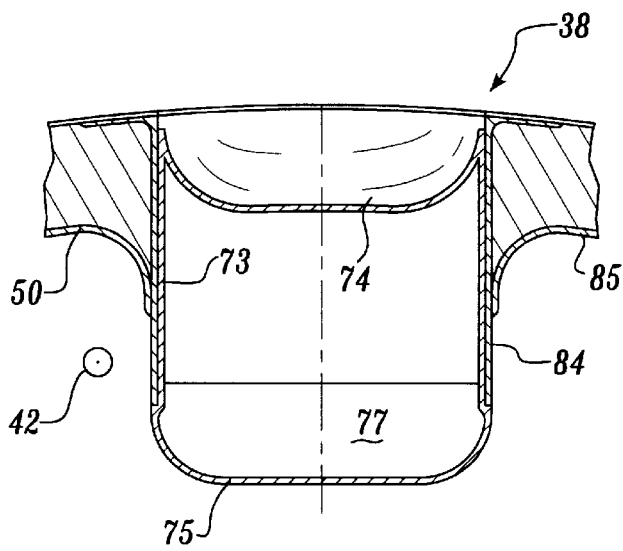
FIG. 8 is a cross-sectional view looking forward along line 8—8 of FIG. 3.

As shown in FIGS. 2, 3, 5, and 7, the outer wall 74 is formed with inlet lip 76 to make the scoop inlet better adaptable to different operating conditions. At the outlet, the exterior surface of the scoop outer wall 74 curves inwardly, as shown in FIGS. 7 and 8. The scoop outer wall 74 interior surface is also rounded at the outlet in order to conform with the fixed duct shape downstream. The corners where the sides 73 meet the inner wall 75 are curved to provide a smooth path for both ambient airflow 40 and engine exhaust 42. Configuring the interior surface of the ejectors in the manner just described can be accomplished in any one of a number of different ways, depending largely on the method of ejector construction selected. The preferred construction method is hot forming in conjunction with welding or superplastic forming. Candidate ejector materials include stainless steel, Inconel, or if the bypass ratio is high and exhaust gas temperatures low enough, even titanium could be considered.

Referring to FIGS. 2, 3, and 6, each scoop ejector 38 is rotatably connected to the outer structure 46 at a pivot pin or hinge 80 having an axis of rotation 82 oriented transverse to the engine longitudinal centerline. Each hinge 80 is interconnected between the inboard surface of an ejector inner wall and the outboard surface of the rigid structure 84. The hinge is located at approximately 60% of the distance from the inlet 71 to the outlet 72. As stated above, the nozzle sidewalls 50 are formed of the rigid structures 84 in alternating arrangement with the outwardly bulged portions 85. The rigid structure 84 forms the portion of the nozzle sidewalls 50 that is located at each ejector. The rigid structure 84 acts as a support and attachment structure for its respective ejector. As shown in FIG. 6 and 8, the rigid structure 84 transitions in a generally smooth manner into its adjacent outwardly bulged portions.

The rigid structure 84 includes a cutout region 87 (see FIGS. 6 and 7) formed aft of its hinge connection. The cutout region 87 allows the scoop ejector outlet to pivot inward toward the engine centerbody during use. The cutout region 87 ends past the location of the ejector, thereby allowing the rigid structure 85 to continue aft of the ejector to a aft nozzle flap hinge location 118. The lower wall 75 of each ejector is shaped to mate with the rigid structure cutout 87 as shown best in FIG. 7. Preferably, seals 86 are positioned between the lower wall mating surface and the cutout region 87 so that high pressure engine exhaust will not leak out of the nozzle during non-acoustic modes of operation. The seals 86 are preferably installed along the longitudinal rail of the aft scoop inner wall 75 and along the very aft transverse end of 75. As shown in FIGS. 2 and 3, a small fairing panel 88 may be attached to the scoop lower wall 75 near the hinge 80 to smooth the airflow transition from the rigid structure 84 to the outer surface of the inner wall 75. This is particularly helpful for when the scoop is stowed. It is preferable to include seals along the forward edge of the fairing 88.

Any one of a number of available actuation mechanisms can be used to rotate the scoop ejectors 38 about the hinges 80. One example is shown in FIGS. 2, 3, and 5. This example actuation mechanism includes an idler link 94 having one end rotatably connected to a scoop ejector inlet 71 at approximately the lateral center of the inlet lip 76. See FIG. 5. A small slit (not shown) is required in the forward edge of the scoop inner wall 75 in order to accommodate the idler link 94 in an extended position as shown in FIG. 2. A rotary actuator 96 is positioned in the outer structure 46, upstream of each of the ejectors 38. As shown in FIGS. 2 and 3, a mounting bracket 100 is used to attach the actuator 96 directly to the mount ring 66. A radial arm 102 that extends outwardly from the actuator 96 is rotatably connected to the other end of the idler link 94. Rotation of the actuator arm 102 causes the idler link 94 to move, causing the related scoop ejector 38 to rotate at the hinge 80.

Each scoop ejector 38 includes open and closed positions corresponding to noise suppression and non-noise suppression flight modes of operation. In the closed position shown in FIG. 3, the outer walls 74 of the scoop ejectors 38 are shaped to mate with the outer walls of the adjacent outer structure 46, though, the stowed inlet lip 76 may be formed to create a small aft-facing step in the exterior surface 48. Likewise, the aft position of the inboard surfaces of the scoop ejector inner walls 75 form portions of the duct sidewalls. The aft half of the outer surface of the scoop ejector outer walls 74 are covered by fairings 104 that are cantilevered forward from the downstream ring 112, as shown in FIGS. 2 and 3. These fairings 104 reduce the aerodynamic drag caused by the ambient air 40 passing over the outside of the ejectors 38. A smaller fairing 105 may be attached to the ejector outer wall 74 to further guide ambient airflow when the ejectors are stowed.

When the actuation mechanisms are activated, the forward end of the scoop ejectors are pivoted about the hinge 80 so that the inlet 71 extends into the ambient airstream and the outlet 72 extends into the duct 56. Preferably, the ejector rotates through an angle of between 15 to 35 degrees when going from the closed position to open position. When in the open position, the location of the centerbody 52 should be coordinated with respect to the position of the scoop ejector outlet so as to create the desired throat size at a desired location.

Regardless of the type of actuation mechanism selected, the actuation for the scoops should be synchronized, which is best accomplished by using an interconnecting drive shaft system. The phasing of the scoop and plug motions can be controlled by an electronic engine control system, which itself is preferably tied into a flight management computer. Because the scoops have only two basic positions, closed or open, modulation between positions is not a problem. Regardless, the scoop motion should be closely monitored to ensure that it is matched with the plug position in order to maintain a duct throat area acceptable for safe engine operation.

Referring to FIGS. 2 and 3, located aft of the aft closeout member is the annular tie ring 112, which connects the aft ends of the multiple longitudinal support beams 69 located between the scoop ejector. A series of interleaf segments or final nozzle aft flaps 114 are cantilevered rearwardly from the tie ring 112 at hinges 118. The aft flaps 114 provide the remaining nozzle structure. Actuation of the aft flaps may be accomplished using various known techniques and is not shown. The nozzle aft flaps 114 are used to control the divergence of the aft part of the nozzle in order to match the nozzle geometry to the engine power setting and Mach number requirements. In the low speed acoustic mode with the scoop ejectors open, the plug 58 is moved fore and aft to control the throat for varying engine power settings. The final nozzle flaps 114 are also moved slightly in or out to change the discharge area and convergence/divergence configuration of the exhaust's final duct path.

Preferably a plurality of acoustic liners 116 are provided along the aft inner nozzle walls, the nozzle aft flap inner surfaces, as well as the plug aft surfaces. The acoustic linings 116 help to reduce internal jet mixing noise, including noise caused by mixing of the bypass and primary engine airflows and/or mixing of the engine exhaust 42 with the entrained ambient air 40.

During noise suppression, the scoop ejectors 38 are moved to their open position, and the plug 58 is moved fore and aft to control the throat for varying engine power settings. The final nozzle flaps 114 may also move slightly inboard or outboard to change the nozzle exit area and the degree of convergence/divergence of the final nozzle. In the upper half of FIG. 2, the nozzle 36 is shown positioned for noise suppression at a low engine power setting. The ejector scoops 38 are fully open, the centerbody 52 is translated forward, and the aft flaps 114 are opened slightly to provide the proper amount of duct divergence. In the lower half of FIG. 2, the nozzle 36 is shown positioned for noise suppression at a higher engine power setting. The centerbody 52 is translated slightly rearward and the aft flaps 114 are rotated slightly inward. The plug crown 60 is sized to just clear the aft edge of the open scoop ejectors. This assures unimpeded plug axial motion during manipulation of the duct area, without regard to the scoop ejector's position.

When noise suppression is not needed, such as during subsonic, transonic and supersonic cruise flight, the scoop ejectors 38 are rotated closed as shown in FIG. 3. In the upper half of FIG. 3, the nozzle 36 is shown positioned for non-noise suppression representative of a subsonic cruise case, with the engine throttled back and the throat near the final nozzle portion. In the lower half of FIG. 3, the nozzle 36 is shown positioned for non-noise suppression representative of a supersonic cruise case. The plug 58 is moved aft with the plug crown at or slightly forward of the hinge points 118 of the nozzle doors 114. Slight forward movement of the plug will increase throat area. For transonic acceleration at maximum engine power, the plug crown should be positioned near the nozzle flap hinge points 118 with the nozzle flaps 114 in a position between the subsonic and supersonic cruise cases.

As can be seen in FIG. 3, the ejector region of the nozzle provides a large cross-sectional area for non-acoustic modes of operation with the plug aft. This means that the local duct Mach numbers are very low (0.2–0.35), so that the daisy type cross-section of the outer wall that houses the scoops causes very little duct loss in any of the non-acoustic cruise modes.

It can be readily appreciated from the foregoing description that the present invention has many advantages. In particular, the nozzle 36 has a much smaller adverse weight and drag impact on the aircraft since the ejector nozzle is short and acquires no significant increase in nacelle diameter, which keeps nacelle skin friction and wave drag low. The ejectors have virtually no impact on nozzle performance characteristics during subsonic, transonic and supersonic flight.

The low aspiration ratio ejector has a much more moderate thrust lapse rate with increasing forward speed and could therefore also be used for noise suppression in the far field during climb-out at speeds of up to Mach 0.7 or even 0.8. The scoop ejector with a ram inlet and some capability for external compression may be superior to flush inlets in its ability to perform well at higher subsonic Mach numbers.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follow:

1. A noise suppression exhaust nozzle for an intermediate bypass ratio aircraft engine, the nozzle comprising:
   (a) an axisymmetric outer structure having interior sidewalls and a centerbody located within the sidewalls, the area between the centerbody and the sidewalls defining a convergent-divergent exhaust duct for passage of nozzle exhaust;
   (b) a plurality of scoop ejectors positioned within the nozzle outer structure; each scoop ejector having a forward inlet, an aft outlet, and a passage therebetween; the scoop ejectors being rotatably connected to the outer structure at a location approximately midway along the longitudinal length of the ejector; and
   (c) an actuation mechanism for rotating the scoop ejectors between open and closed positions, the rotation of the ejectors to the open position causing the inlet to extend into airflow exterior to the nozzle and the outlet to extend into the duct, whereby aspirated air is induced into each open scoop ejector, the aspirated air combining with engine exhaust.

2. The noise suppression exhaust nozzle according to claim 1, wherein the scoop ejectors are spaced equal distances apart about the outer structure and wherein the duct has greater radial dimension in the regions between the scoop ejectors than at the scoop ejectors.

3. The noise suppression exhaust nozzle according to claim 1, wherein the rotatable connection of each scoop ejector to the outer structure is about an axis of rotation lying generally transverse to the nozzle longitudinal centerline.

4. The noise suppression exhaust nozzle according to claim 3, wherein the actuation mechanism includes a number of rotary actuators located in the outer structure at a position forward of the scoop ejectors.

5. The noise suppression exhaust nozzle according to claim 1, wherein each scoop ejector includes a curved aft inner surface for reducing engine exhaust airflow turbulence.

6. The aircraft engine noise suppression exhaust nozzle according to claim 1, wherein each scoop ejector includes a rounded inlet lip along the ejector outer forward inlet edge.

7. The noise suppression exhaust nozzle according to claim 1, wherein each scoop ejector passage converges in going from the inlet to the outlet.

8. The noise suppression exhaust nozzle according to claim 1, wherein the scoop ejector is shaped to guide aspirate air into the nozzle in an S-shaped path.

9. The aircraft engine noise suppression exhaust nozzle according to claim 1, wherein the aspirate air is ambient air and the engine exhaust includes primary exhaust and bypass airflows, the ambient air being entrained in an amount lying in the range between about 20% to about 40% of the engine exhaust.

10. The noise suppression exhaust nozzle according to claim 1, wherein when moving between fully closed and fully open position, each scoop ejector rotates through an angle lying in the range between about 15 and about 35 degrees relative to the nozzle longitudinal centerline.

11. The noise suppression exhaust nozzle according to claim 1, wherein the plurality of scoop ejectors lies in the range between about 12 and about 36 scoop ejectors.

12. The noise suppression exhaust nozzle according to claim 1, wherein the exterior shape of the outer structure is substantially cylindrical; the interior sidewalls are bulged outwardly between the locations of the scoop ejectors; and the centerbody includes a longitudinally translatable plug having a crown.

13. The noise suppression exhaust nozzle according to claim 12, further including a rigid structure for supporting the ejectors, the rigid structures alternating between the outwardly bulged sidewall regions.

14. The noise suppression exhaust nozzle according to claim 13, wherein the rigid structures provide space within which the scoop ejectors are housed in their stowed position, the rigid structures having a cutout through which the ejectors outlets extend inwardly during the ejector open position.

15. The noise suppression exhaust nozzle according to claim 12, wherein the plug can be translated to locations both ahead of and behind the nozzle interior sidewall bulge in a manner unimpeded by the scoop ejectors.

16. The noise suppression exhaust nozzle according to claim 12, wherein the duct cross-sectional area at the nozzle interior sidewall bulge is large when the plug is translated to an aft position in order to reduce the engine exhaust velocity in the duct.

17. The noise suppression exhaust nozzle according to claim 16, wherein the nozzle interior sidewalls and plug form a throat and the scoop ejectors are located near the throat when the scoop ejectors are in their open positions.

18. A scoop ejector for use in an aircraft turbofan engine exhaust nozzle for use in reducing engine noise, the scoop ejector comprising a forward inlet, an aft outlet, and a passage therebetween; the scoop ejector being rotatably connected to the nozzle at a location approximately midway along the ejector longitudinal length; the axis of rotation being transverse to the nozzle longitudinal centerline; an actuation mechanism for rotating the scoop ejector between open and closed positions, wherein rotation of the ejector to the open position causes the inlet to extend outward past an outer structure of the exhaust nozzle and the outlet to extend into a duct of the exhaust nozzle.

19. The scoop ejector according to claim 18, further comprising a curved aft inner surface for reducing engine exhaust airflow turbulence.

20. The scoop ejector according to claim 18, further comprising a rounded inlet lip along the ejector outer forward inlet edge.

21. The scoop ejector according to claim 18, wherein the passage converges in going from the inlet to the outlet.

22. The scoop ejector according to claim 18, wherein the passage is shaped to guide aspirate air into the nozzle in an S-shaped path.

23. The scoop ejector according to claim 18, wherein when moving between fully closed and fully open position, each scoop ejector rotates through an angle lying in the range between about 15 and about 35 degrees.

* * * * *

UNITED STATES PATENT AND TRADEMARK OFFICE
CERTIFICATE OF CORRECTION

PATENT NO. : 5,826,794
DATED : October 27, 1998
INVENTOR(S) : P.K.C. Rudolph

It is certified that error appears in the above-indentified patent and that said Letters Patent is hereby corrected as shown below:

| COLUMN | LINE | ERROR |
|---|---|---|
| 10 (Claim 10, | 56 line 3) | "position" should read --positions-- |
| 11 (Claim 14 | 9 line 5 | "ejectors" should read --ejector-- |
| 12 (Claim 23, | 22 line 2) | "position" should read --positions-- |

Signed and Sealed this

Sixth Day of April, 1999

Attest:

Q. TODD DICKINSON

*Attesting Officer*         *Acting Commissioner of Patents and Trademarks*